United States Patent [19]

Eiermann

[11] Patent Number: 4,850,827
[45] Date of Patent: Jul. 25, 1989

[54] COOLING SYSTEM OF AN ECCENTRIC SHAFT OF A ROTARY PISTON INTERNAL COMBUSTION ENGINE

[75] Inventor: Dankwart Eiermann, Weissensberg-West, Fed. Rep. of Germany

[73] Assignee: Wankel GmbH, Berlin, Fed. Rep. of Germany

[21] Appl. No.: 82,039

[22] Filed: Aug. 5, 1987

[30] Foreign Application Priority Data

Aug. 18, 1986 [DE] Fed. Rep. of Germany ....... 3627956

[51] Int. Cl.[4] .......................... F01C 1/22; F01C 21/04
[52] U.S. Cl. ....................................... 418/61.2; 418/94
[58] Field of Search ................................ 418/61 A, 94

[56] References Cited

U.S. PATENT DOCUMENTS

| | | | |
|---|---|---|---|
| 1,098,440 | 6/1914 | Hicks, Jr. et al. | 418/94 |
| 2,027,594 | 1/1936 | Huff | 418/94 |
| 3,042,009 | 7/1962 | Froede et al. | 418/94 |
| 3,091,386 | 5/1963 | Paschke | 418/94 |
| 3,180,563 | 4/1965 | Jones et al. | 418/61 A |
| 3,390,667 | 7/1968 | Beurtheret | 418/94 |
| 4,297,090 | 10/1981 | Hoffmann | 418/94 |

Primary Examiner—John J. Vrablik
Attorney, Agent, or Firm—Becker & Becker, Inc.

[57] ABSTRACT

A triangular piston is journalled rotating in a planetary manner upon an eccentric of an eccentric shaft journalled in a housing of a rotary piston internal combustion engine of trochoidal type of construction with a fluid cooled system in the housing with a multi-arcuate casing runway surfacing of which the side walls have the eccentric shaft passing therethrough. An eccentric bearing is cooled directly by a cooling medium conveyed via a bypass of the cooling system of the housing branched off from the cooling system and the cooling medium is conveyed via hollow spaces in the eccentric shaft into a location at the eccentric journalling the triangular piston. The cooling medium is supplied and carried away via lines opening into an annular groove extending around the eccentric in a location below and radially inwardly of the eccentric bearing. A supply line is provided in the eccentric shaft for supply of cooling medium to the annular groove and this supply is continuously in connection and in communication with at least one radial bore to the annular groove in a region of the eccentricity maximum of the eccentric and in a region of the eccentricity minimum of the eccentric there is arranged at least one bore leading back from the annular groove, which latter groove opens into an axial return flow line in the eccentric shaft and that furthermore the feed and return lines are connected to the bypass of the cooling system of the housing.

4 Claims, 4 Drawing Sheets

COOLING SYSTEM OF AN ECCENTRIC SHAFT OF A ROTARY PISTON INTERNAL COMBUSTION ENGINE

BACKGROUND OF THE INVENTION

1. Field of the Invention

The present invention relates to an eccentric shaft of a rotary piston internal combustion engine of trochoidal type of construction with a fluid-cooled housing with a multi-arc casing runway surfacing, of which the side walls have an eccentric shaft passing therethrough. Pistons are mounted and journalled rotating upon an eccentric or eccentrics of the eccentric shaft and these pistons have planetary-type rotation with corners of the pistons in continuous engagement along the casing runway surfacing. An eccentric bearing means for the pistons on the eccentrics of the eccentric shaft are cooled by a cooling medium branched off via a bypass of the cooling system of the housing and conveyed via hollow spaces or chambers in the eccentric shaft and in the eccentric means.

A purpose of such formation or construction of the eccentric shaft is to cool the eccentric bearing not as previously via the piston but rather directly.

2. Description of the Prior Art

An eccentric shaft constructed hollow for a rotary piston internal combustion engine is described in a copending U.S. application Ser. No. 876,197-Eiermann filed June 19, 1986 and belonging to the assignee of the present invention as based upon a German application Ser. No. P 35 45 820.8 (PW 49). Fluid or liquid cooling medium is supplied via a bypass of the housing cooling system through a hollow chamber of the eccentric shaft and through a pipe or tube concentric to the eccentric shaft, preferably rotating with the eccentric shaft and this cooling medium is carried away again in an annular space or chamber around this pipe or tube. In that way, the eccentric bearing can be cooled directly so that an indirect cooling via the piston with oil, mixture or suctioned air no longer is required. The cooling of the piston itself, when the piston consists of a good heat-conducting material, for example aluminum, can occur via the housing side walls. A cooling system adapted for such an arrangement is disclosed and described in a copending U.S. patent application Ser. No. 944,808-Eiermann filed Dec. 19, 1986 belonging to the assignee of the present invention and based upon a German application of Ser. No. P 35 45 818.6 (PW 48).

With such hollow shafts there is to be noted that an otherwise unattainable weight reduction of the internal combustion engine can be attained, which however would be justified only for predetermined applications or use situations including for example aircraft engines or portable units that would justify the utilization of special and novel techniques.

SUMMARY OF THE INVENTION

An object of the present invention is to provide an arrangement for cooling of an eccentric bearing, which can be produced with conventional chip removing methods or procedures.

This object is resolved and fulfilled with an eccentric shaft having features applicable for a rotary piston internal combustion engine and having features in accordance with the present invention.

Stationary and vehicular internal combustion engines can be provided with such a cooling system, although with these the concern is less involved with weight and the same results are attainable with that as with the hollow shaft cooling as mentioned previously in the foregoing paragraphs.

BRIEF DESCRIPTION OF THE DRAWINGS

This object, and other objects and advantages of the present invention, will appear more clearly from the following specification in conjunction with the accompanying drawings, in which.

DESCRIPTION OF PREFERRED EMBODIMENTS

Figure 1:
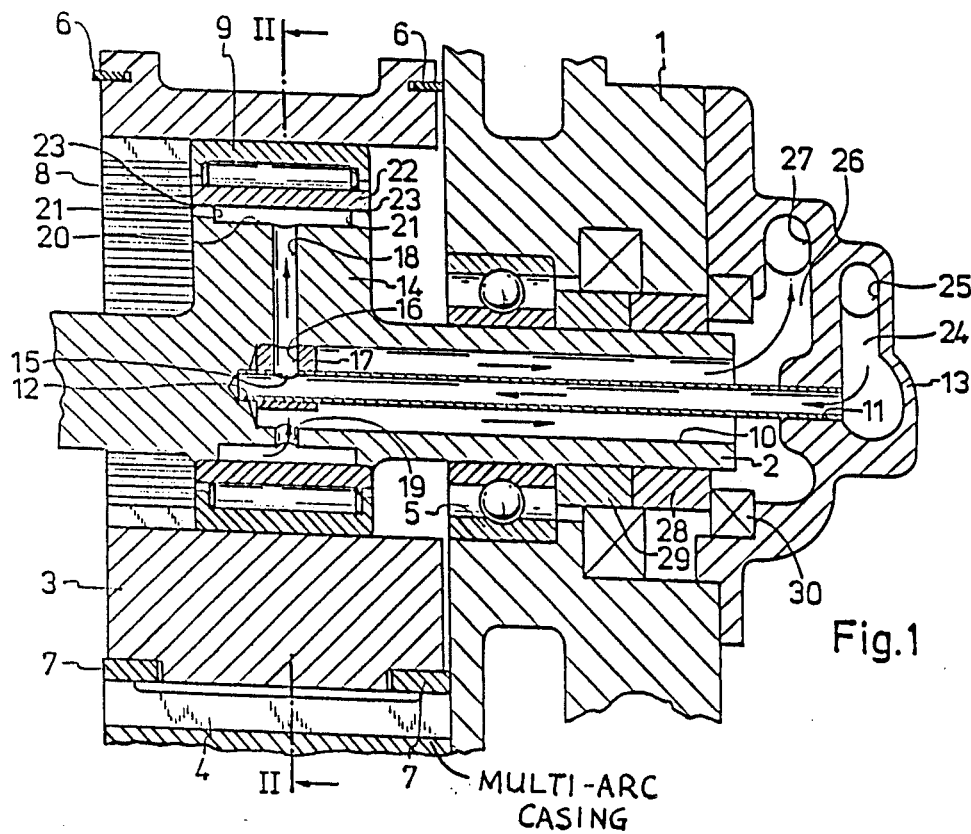
FIG. 1 is a view that shows a partial axial section taken along line I—I in FIG. 2.
Figure 2:
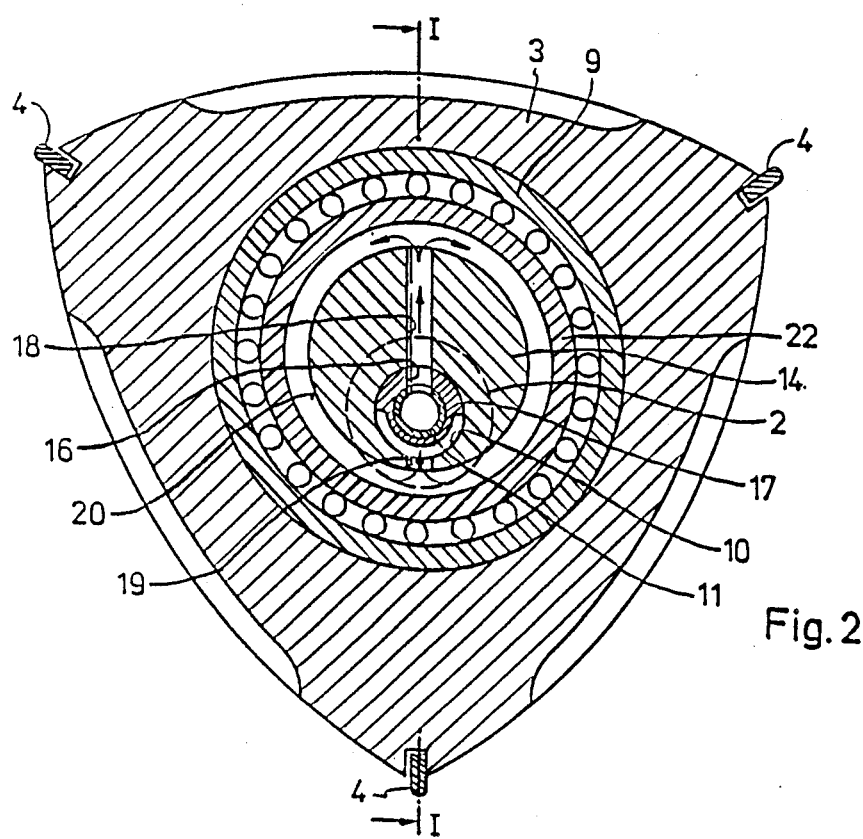
FIG. 2 is a view that shows a radial section taken along line II—II in FIG. 1.

Referring now to the drawing in detail, FIG. 1 is a view that shows an eccentric shaft 2 journalled or mounted in a side part 1 of a rotary piston internal combustion engine with dual-arc trochoidal-shaped casing runway surfacing of a housing otherwise not illustrated in further detail. A triangular piston 3 shown in FIGS. 1 and 2 has radial sealing strips 4 arranged in corners of the triangular piston and sliding or gliding in continuous engagement along the casing runway surfacing. The eccentric shaft 2 runs or operates in a bearing 5 shown centrally to the right of the piston 3 in FIG. 1 of the drawing. A bearing arranged in a left side part of the housing as well as pinion stationary in this side part along with the bearing of the left side part are not shown or illustrated in the views of the drawing. However, a further piston can be thought of in the left side of the drawing and this will be considered again subsequently herein.

The piston 3 is massive and solid and consists of aluminum. The piston 3 has radial sealing strips 4, axial sealing strips 6, sealing pins, bolts or plugs 7 and a transmission hollow gear 8. The eccentric bearing 9 is a roller bearing.

The eccentric shaft 2 has a concentric bore 10 extending from the right side as far as to beyond the middle of the piston 3 with two disk machines as far as to beyond the middle of the second piston to be thought of to the left in the view of FIG. 1. A pipe or tube 11 turning or rotating with a shaft is arranged concentrically in the bore 10; this pipe or tube 11 on the one hand is fastened or secured in a further bore 12 in the eccentric shaft 2 by being screwed or threaded-in, adhesively secured or the like and journalled in a housing cover 13 shown at the right in FIG. 1. The pipe or tube 11 has an opening 15 in a direction toward the eccentricity maximum of the eccentric 14; this opening 15 coincides with a bore 16 which is provided in an insert or distance piece 17 located sealingly around a left end of the pipe or tube 11. This bore 16 is oriented or aligned in turn with a bore 18 extending radially in the eccentric 14 at the eccentricity maximum thereof. The insert or distance piece 17 leaves free a half-round or semi-circular annular space around the pipe or tube 11 on the side of the eccentricity minimum, from which a further radial bore 19 in the eccentric 14 leads into a bore 10 in the eccentric shaft 2.

An annular groove 20 extending around the eccentric 14 is turned or machined into the circumference or periphery of the eccentric 14 and the bores 18 and 19 open into this annular groove 20. This groove 20 is substantially as wide as the eccentric 14 at the eccentric bearing 9 as far as to narrow edges 21 left standing.

Figure 3:
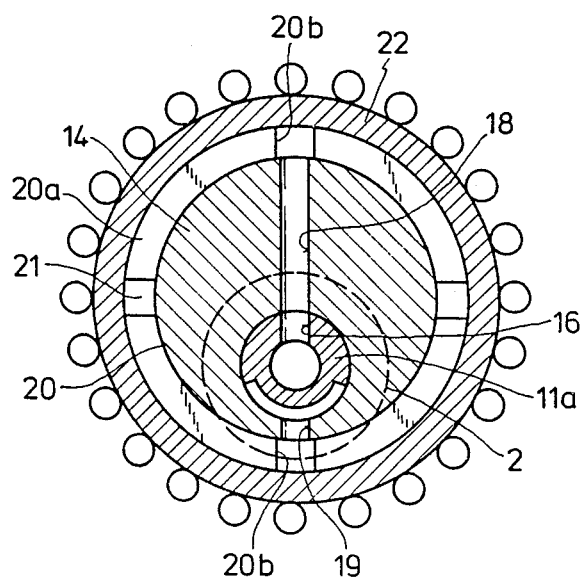
FIG. 3 is a view that shows a partial axial section similar to that of FIG. 1 particularly for the left half thereof to illustrate further features of the present invention including support rings and axially directed interruptions.
Figure 4:
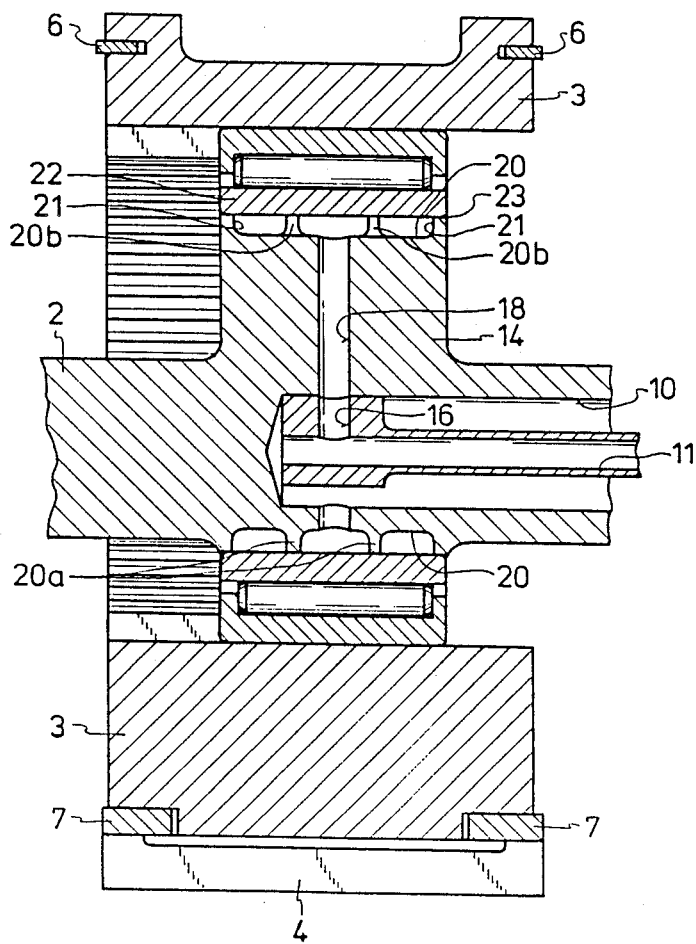
FIG. 4 is a view that shows a radial section similar to that of FIG. 2 particularly for a central portion thereof to illustrate further features of the present invention according to FIG. 3 including support rings and axially directed interruptions.

Intermediate webs or lands with wider pistons can remain standing as support rings 20a in the annular groove 20 and extending as far as to around the eccentric periphery or circumference, although these intermediate webs or lands must provide axially directed interruptions 20b, however illustrated in FIG. 3 and FIG. 4. An inner shell, sleeve or raceway 22 of the eccentric bearing 9 is pushed onto the eccentric 14 and is fastened by welding at 23 or by soldering, adhesive or by arrangement of sealing O-rings.

A space or chamber 24 is provided centrally in the housing cover 13; this space or chamber 24 is connected or in communication with the supply line of the cooling medium circulation of the housing via an opening 25 and an inner wall configuration thereof is shaped or formed in a manner advantageous for flow. The right end of the tube 11 opens into this space or chamber 24. Furthermore, a further space or chamber 26 is arranged inwardly of the space or chamber 24 in the housing cover 13; a return flow connection to the aforementioned bypass exists from the further chamber 26 via the opening 27. The bore 10 of the eccentric shaft 2 opens into the space or chamber 26. Slide rings 28 and 29 are provided with respect to the side part 1 and on the eccentric shaft 2 and the space or chamber 26 is sealed off at 30 in this way.

The cooling medium flows through the opening 25 into the space or chamber 24 and from there through the pipe or tube 11 through the opening 15, the bore 16 in the insert or distance piece 17 and from there accelerates via centrifugal force effect through the bore 18 into the annular chamber of the annular groove 20. The cooling medium heated in the annular groove 20 and with that made lighter is forced or displaced by the freshly flowing-in cooling medium through centrifugal force effect into the region of the eccentricity minimum of the eccentric 14 and through the bore 18 into the annular chamber between the bore 10 and the pipe or tube 11 and such cooling medium so forced and displaced flows accelerated through the suction of the cooling medium circulating pump in the chamber 26 and through the opening 27 back into the cooling medium circulation of the housing.

Several radial bores can be provided in the same manner in the eccentric 14 in place of the bores 18 and 19 and these radial bores can be connected or in communication with bores oriented or aligned therewith in the insert or distance piece 17 with the pipe or tube 11 as supply lines of the cooling medium to the annular groove 20, respectively leading as return flow lines into the bore 10. However the flow cross sections of the supply bores altogether are to be identical to the entire flow cross section of the return flow bores. This feature simultaneously has the advantage that the mass of the eccentric is reduced. Likewise in place of the bores 18 and 19 there is noted that slots can be cut or milled with an approximately slotted-shape cross section. A separate sleeve or bushing can be provided for radial termination of the annular groove 20 in place of the inner shell, sleeve or raceway 22 of the eccentric bearing 9; this separate sleeve or bushing for radial termination of the annular groove 20 on the other hand can be sealingly and rigidly connected with the eccentric 14 and can be pushed onto the eccentric bearing 9.

With the arrangement of two or further pistons and eccentrics there repeats with each thereof the arrangement of the here described eccentric 14 and the insert or distance piece 17 in the bore 10.

The inventive arrangement of the cooling lines or conduits can be produced by a simple and straightforward boring and turning-out. The arrangement of the cooling lines is sufficient and adequate in order to cool the eccentric bearing and the eccentric shaft completely, which means that the temperature of the eccentric bearing and the eccentric shaft can be held at approximately 80° C.

The present invention is, of course, in no way restricted to the specific disclosure of the specification and drawings, but also encompasses any modifications within the scope of the appended claims.

What I claim is:

1. An eccentric shaft of a rotary piston internal combustion engine of trochoidal type of construction with a fluid-cooled housing having a casing runway surfacing, of which side walls of the housing have an eccentric shaft passing therethrough including eccentric means including hollow chambers provided on the eccentric shaft and including planetary-type triangular piston means mounted on said eccentric means of said eccentric shaft and journalled rotating in continuous engagement with corners of the triangular piston means against the casing runway surfacing, of which eccentric bearing means cooled in effect by a cooling medium conveyed and branched via a bypass of the cooling system of the housing and via hollow chambers in the eccentric shaft itself as well as being conveyed in the eccentric means having the hollow chambers provided internally therewith, the improvement therewith comprising:

a means for supplying and taking away cooling medium including an annular groove means extending around said eccentric means, and conduits extending through the eccentric shaft and into said annular groove means below an eccentric bearing means for the eccentric means journalling said triangular piston means, said bearing means being cooled in effect only by the cooling medium indirectly via the hollow chambers of said eccentric means provided on the eccentric shaft, a supply line provided in the eccentric shaft for feeding of cooling medium to the annular groove means, said line being in continuous connection and communication with at least one radial bore means to supply cooling medium to the annular groove means in a region of an eccentricity maximum of said eccentric means and furthermore that in a region of the eccentricity minimum of said eccentric means at least one return bore means is arranged leading back from the annular groove means, which return bore means leading back to the annular groove means opens into an axial return flow line in the eccentric shaft, and that furthermore the feed line and the return flow line are connected to the bypass of the cooling system of a housing of the rotary piston internal combustion engine, the eccentric shaft being provided with a coaxial bore that is the return flow line for the cooling medium, into which further bore means open for returning of the cooling medium from the annular groove means, and that coaxially in this coaxial bore there is arranged a narrower tube rotating with the eccentric shaft, which narrower tube is in continuous connection and communication with further bore means for supply and feeding of the cooling medium to the annular groove means, and that at an output end of the eccentric shaft, there is provided a space or chamber in a housing cover, via which the tube is connected and in communication with a feed of the bypass of the cooling system, as well as a further space separate from the chamber in the housing cover is provided, which further space connects the annular space between said coaxial bore and the tube with the return of the bypass of the housing cooling system, a further narrower bore provided concentrically into the previously noted bore, one end of said tube being securely fitted into the further narrow bore, and an insert distance piece provided on said tube within said eccentric, which insert distance piece having bores connecting with respect to the annular space between said tube and the previously noted bore terminated therewith, with which bore means are oriented and in alignment in the eccentric means for feeding of cooling medium and bores communicating with openings in the tube.

2. An eccentric shaft according to claim 1, in which said tube and said insert distance piece are integral and unitary in one piece.

3. An eccentric shaft of a rotary piston internal combustion engine of trochoidal type of construction with a fluid-cooled housing having a casing runway surfacing, of which side walls of the housing have an eccentric shaft passing therethrough including eccentric means including hollow chambers provided on the eccentric shaft and including planetary-type triangular piston means mounted on said eccentric means of said eccentric shaft and journalled rotating in continuous engagement with corners of the triangular piston means against the casing runway surfacing, of which eccentric bearing means cooled in effect by a cooling medium conveyed and branched via a bypass of the cooling system of the housing and via hollow chambers in the eccentric shaft itself as well as being conveyed in the eccentric means having the hollow chambers provided internally therewith, the improvement therewith comprising:

a means for supplying and taking away cooling medium including an annular groove means extending around said eccentric means, and conduits extending through the eccentric shaft and into said annular groove means below an eccentric bearing means for the eccentric means journalling said triangular piston means, said bearing means being cooled in effect only by the cooling medium indirectly via the hollow chambers of said eccentric means provided on the eccentric shaft, a supply line provided in the eccentric shaft for feeding of cooling medium to the annular groove means, said line being in continuous connection and communication with at least one radial bore means to supply cooling medium to the annular groove means in a region of an eccentricity maximum of said eccentric means and furthermore that in a region of the eccentricity minimum of said eccentric means at least one return bore means is arranged leading back from the annular groove means, which return bore means leading back to the annular groove means opens into an axial return flow line in the eccentric shaft, and that furthermore the feed line and the return flow line are connected to the bypass of the cooling system of a housing of the rotary piston internal combustion engine, the eccentric shaft being provided with a coaxial bore that is the return flow line for the cooling medium, into which further bore means open for returning of the cooling medium from the annular groove means, and that coaxially in this coaxial bore there is arranged a narrower tube rotating with the eccentric shaft, which narrower tube is in continuous connection and communication with further bore means for supply and feeding of the cooling medium to the annular groove means, and that at an output end of the eccentric shaft, there is provided a space or chamber in a housing cover, via which the tube is connected and in communication with a feed of the bypass of the cooling system, as well as a further space separate from the chamber in the housing cover is provided, which further space connects the annular space between said coaxial bore and the tube with the return of the bypass of the housing cooling system, said tube having an enlarged thickened portion within said eccentric means and in which said bores are provided and from which in a region of minimum eccentricity there is a space left free for return flow of the cooling medium from said bores into the tube.

4. An eccentric shaft of a rotary piston internal combustion engine of trochoidal type of construction with a fluid-cooled housing having a casing runway surfacing, of which side walls of the housing have an eccentric shaft passing therethrough including eccentric means including hollow chambers provided on the eccentric shaft and including planetary-type triangular piston means mounted on said eccentric means of said eccentric shaft and journalled rotating in continuous engagement with corners of the triangular piston means against the casing runway surfacing, of which eccentric bearing means cooled in effect by a cooling medium conveyed and branched via a bypass of the cooling system of the housing and via hollow chambers in the eccentric shaft itself as well as being conveyed in the eccentric means having the hollow chambers provided internally therewith, the improvement therewith comprising:

a means for supplying and taking away cooling medium including an annular groove means extending around said eccentric means, and conduits extending through the eccentric shaft and into said annular groove means below an eccentric bearing means for the eccentric means journalling said triangular piston means, said bearing means being cooled in effect only by the cooling medium indirectly via the hollow chambers of said eccentric means provided on the eccentric shaft, a supply line provided in the eccentric shaft for feeding of cooling medium to the annular groove means, said line being in continuous connection and communication with at least one radial bore means to supply cooling medium to the annular groove means in a region of an eccentricity maximum of said eccentric means and furthermore that in a region of the eccentricity minimum of said eccentric means at least one return bore means is arranged leading back from the annular groove means, which return bore means leading back to the annular groove means opens into an axial return flow line in the eccentric shaft, and that furthermore the feed line and the return flow line are connected to the bypass of the cooling system of a housing of the rotary piston internal combustion engine, the eccentric shaft being provided with a coaxial bore that is the return flow line for the cooling medium, into which further bore means open for returning of the cooling medium from the annular groove means, and that coaxially in this coaxial bore there is arranged a narrower tube rotating with the eccentric shaft, which narrower tube is in continuous connection and communication with further bore means for supply and feeding of the cooling medium to the annular groove means, and that at an output end of the eccentric shaft, there is provided a space or chamber in a housing cover, via which the tube is connected and in communication with a feed of the bypass of the cooling system, as well as a further space separate from the chamber in the housing cover is provided, which further space connects the annular space between said coaxial bore and the tube with the return of the bypass of the housing cooling system, and for a widened piston means including in said annular groove means intermediate webs rotating therewith and arranged so that said annular groove means is axially interrupted thereby.

* * * * *